US011904955B2

(12) United States Patent
Lindberg et al.

(10) Patent No.: US 11,904,955 B2
(45) Date of Patent: Feb. 20, 2024

(54) ACTIVE D PILLAR INTEGRATED INTO A LIFT GATE SPOILER

(71) Applicant: Magna Exteriors Inc., Concord (CA)

(72) Inventors: Braendon R. Lindberg, Metamora, MI (US); Michael Cowan, Macomb, MI (US); Ted E. Peterson, Howell, MI (US)

(73) Assignee: MAGNA EXTERIORS, INC., Concord (CA)

(*) Notice: Subject to any disclaimer, the term of this patent is extended or adjusted under 35 U.S.C. 154(b) by 169 days.

(21) Appl. No.: 17/431,763

(22) PCT Filed: Apr. 21, 2020

(86) PCT No.: PCT/US2020/029105
§ 371 (c)(1),
(2) Date: Aug. 18, 2021

(87) PCT Pub. No.: WO2020/219438
PCT Pub. Date: Oct. 29, 2020

(65) Prior Publication Data
US 2022/0135150 A1 May 5, 2022

Related U.S. Application Data

(60) Provisional application No. 62/837,566, filed on Apr. 23, 2019.

(51) Int. Cl.
*B62D 35/00* (2006.01)
*B62D 37/02* (2006.01)
(52) U.S. Cl.
CPC ........... *B62D 35/007* (2013.01); *B62D 37/02* (2013.01)

(58) Field of Classification Search
CPC .............................. B62D 35/007; B62D 37/02
See application file for complete search history.

(56) References Cited

U.S. PATENT DOCUMENTS

2012/0061992 A1* 3/2012 Ezaka ................. B29C 66/1122
296/180.1
2016/0159412 A1* 6/2016 Oxley ................. B62D 35/007
296/180.5

(Continued)

FOREIGN PATENT DOCUMENTS

DE 102015121030 A1 * 6/2016 ........... B62D 35/007
DE 102016105081 A1 * 9/2017

(Continued)

OTHER PUBLICATIONS

Notification of Transmittal of the International Preliminary report on Patentability for International Application No. PCT/US2020/029105, dated Nov. 4, 2021.

*Primary Examiner* — Lori Lyjak
(74) *Attorney, Agent, or Firm* — Warn Partners, P.C.

(57) ABSTRACT

An active aerodynamic assembly that includes a lift gate having a cavity formed between two panels. An aperture of formed on the outer panel providing access to the cavity. A frame connected to the lift gate within the cavity. A spoiler slidably connected to the frame and moveable along the deployment axis between a stowed position and a deployed position. At least one coupler link connected between the spoiler and the frame that is driven by the actuator along one of the plurality of tracks on the frame. There is also a moveable D pillar contained with the cavity that moves between a stowed position within the cavity and an extended position such that a winglet of the moveable D pillar extends outside of the cavity past the outside surface of the lift gate.

16 Claims, 15 Drawing Sheets

(56) References Cited

U.S. PATENT DOCUMENTS

2019/0382063 A1\* 12/2019 McAfee ............... B62D 35/008
2020/0001935 A1\* 1/2020 Nielsen ................ B62D 35/007

FOREIGN PATENT DOCUMENTS

| EP | 1167100 | A1 | \* | 1/2002 | ............. B60J 7/108 |
|----|---------|----|---|--------|--------------------------|
| EP | 1992550 | B1 | \* | 9/2010 | ........... B62D 35/007 |
| EP | 3269622 | A2 | \* | 1/2018 | ........... B62D 35/007 |
| EP | 3269622 | A2 |   | 1/2018 | |
| FR | 2816906 | A1 | \* | 5/2002 | ........... B62D 35/007 |
| JP | S6410482 | U |   | 1/1989 | |

\* cited by examiner

ACTIVE D PILLAR INTEGRATED INTO A LIFT GATE SPOILER

FIELD OF THE INVENTION

The present invention relates to an active D pillar and spoiler for a rear lift gate.

BACKGROUND OF THE INVENTION

"Spoilers" are known for use in vehicles for providing aerodynamic and styling benefits to various vehicles. In SUV type vehicles the spoiler is typically provided at the upper lift gate area where it is either attached to the roof or to the top of the lift gate of this type of vehicle.

The use of spoilers on SUV type vehicles reduces turbulent air at the back area of SUV's, thereby reducing coefficient of drag (Cd) and improves fuel economy. Static rear spoilers have been implemented to reduce drag but do not provide any adjustability due to their static nature. The present invention seeks to provide an active rear horizontal spoiler used in combination with a static rear spoiler to create a dimensionally adjustable horizontal flow passage with added benefits. The present invention also seeks to provide active D pillar winglets that are contained within the lift gate and move between retracted and extended position, which in combination with an active horizontal spoiler provides further added aerodynamic benefits.

SUMMARY OF THE INVENTION

An active aerodynamic assembly that includes a lift gate having a rear glass with a forward side and a reward side. An inner panel of the lift gate is located forward of the rear glass and an outer panel is connected to the inner panel. When the outer panel and inner panel are connected a cavity is formed between two panels. An aperture is formed on the outer panel and provides access to the cavity. A frame is connected to the lift gate within the cavity. The frame has a plurality of tracks formed on the frame such that the plurality of tracks are parallel to each other and extend along a deployment axis of the frame. There is a spoiler slidably connected to the frame and moveable along the deployment axis between a stowed position and a deployed position. At least one coupler link is connected between the spoiler and one of the plurality of tracks of the frame. The coupler link is driven by the actuator along one of the plurality of tracks of the frame.

The active aerodynamic assembly further includes at least one moveable D pillar having a base portion and a winglet body portion positioned within the cavity and aligned with the aperture. The moveable D pillar is positioned between a stowed position where the winglet body portion is located forward of the rear glass within the cavity and a deployed position where the winglet body portion extends through the aperture past the rearward side of the rear glass. There is further provided an actuator in the cavity that is connected to the base portion of the D pillar for causing the winglet body portion to selectively move between the stowed position and the deployed position.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiments is merely exemplary in nature and is in no way intended to limit the invention, its application, or uses.

Figure 10:
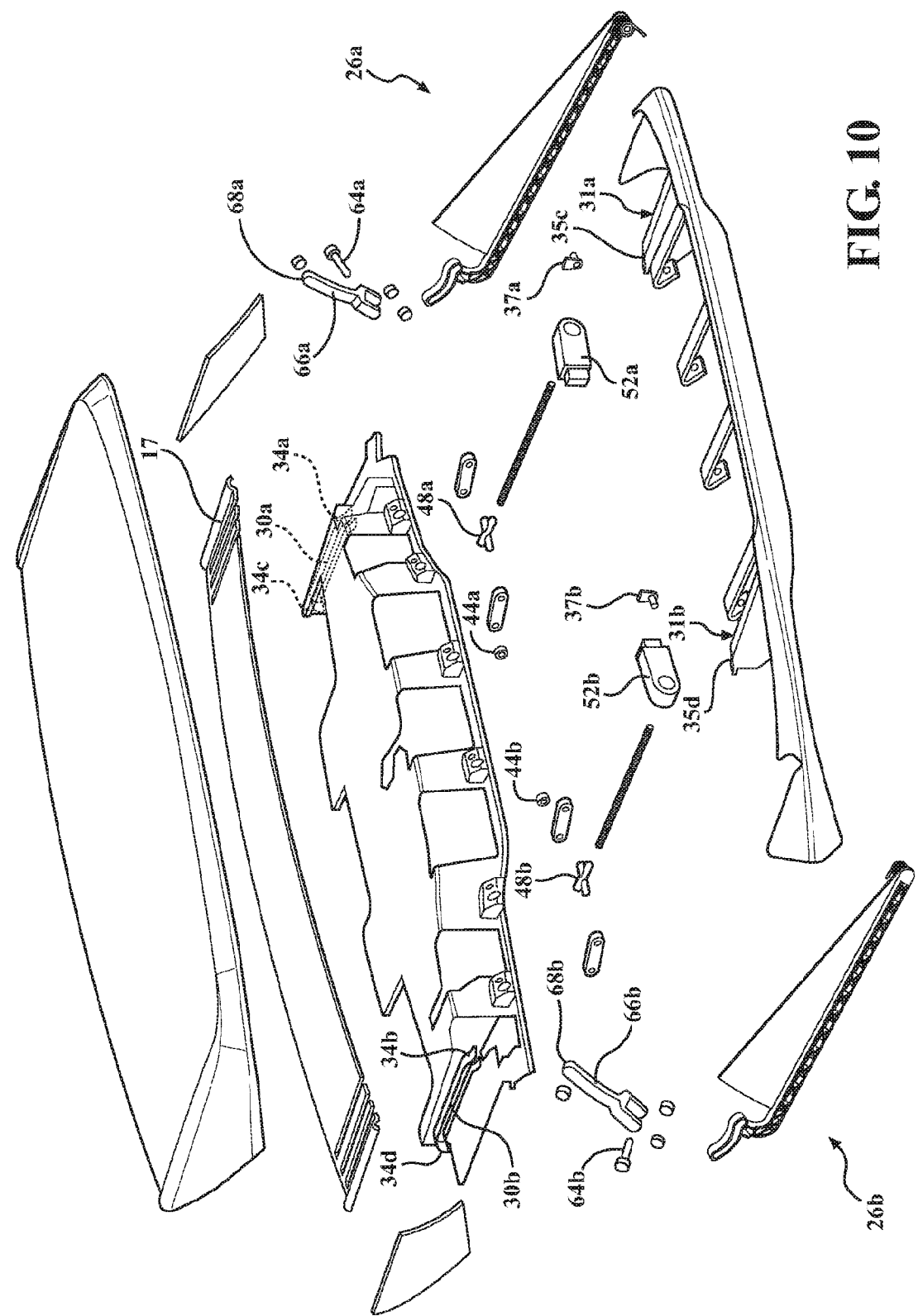
FIG. 10 is an exploded perspective view of the spoiler and D pillar active components.
Figure 11:
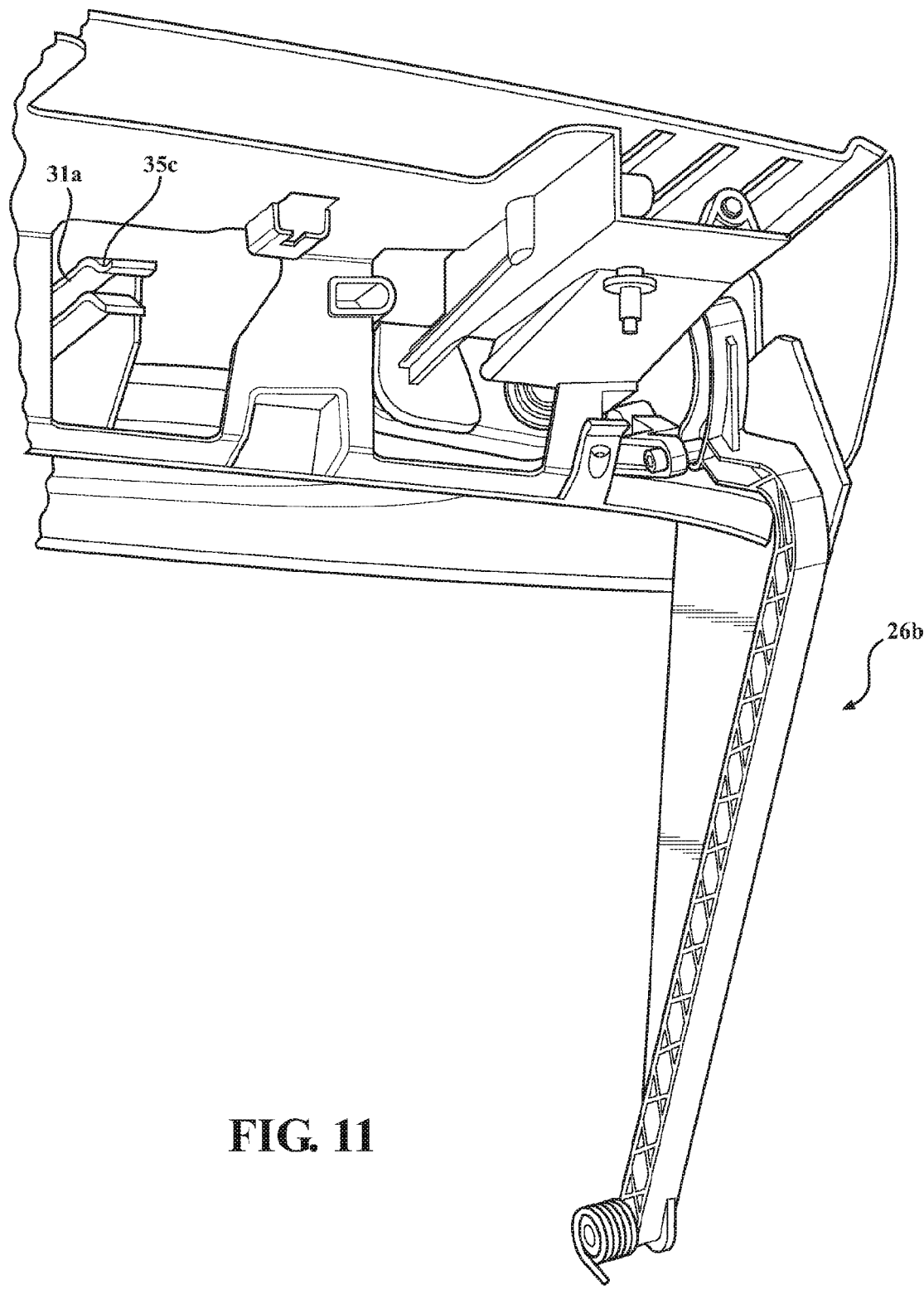
FIG. 11 is a bottom side sectional perspective view of the spoiler in the deployed position.
Figure 12:
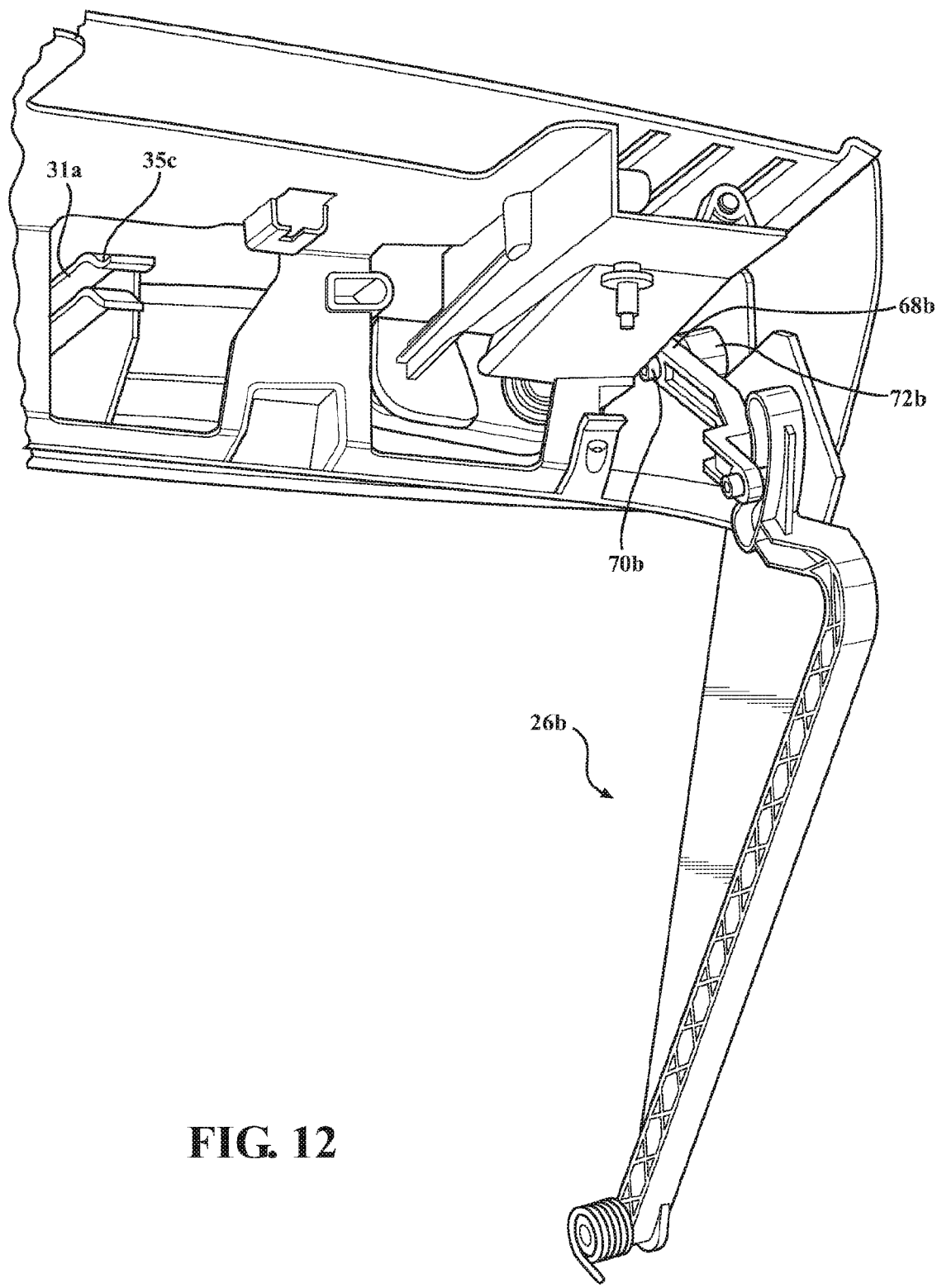
FIG. 12 is a bottom side sectional perspective view of the spoiler in the intermediate position.
Figure 13:
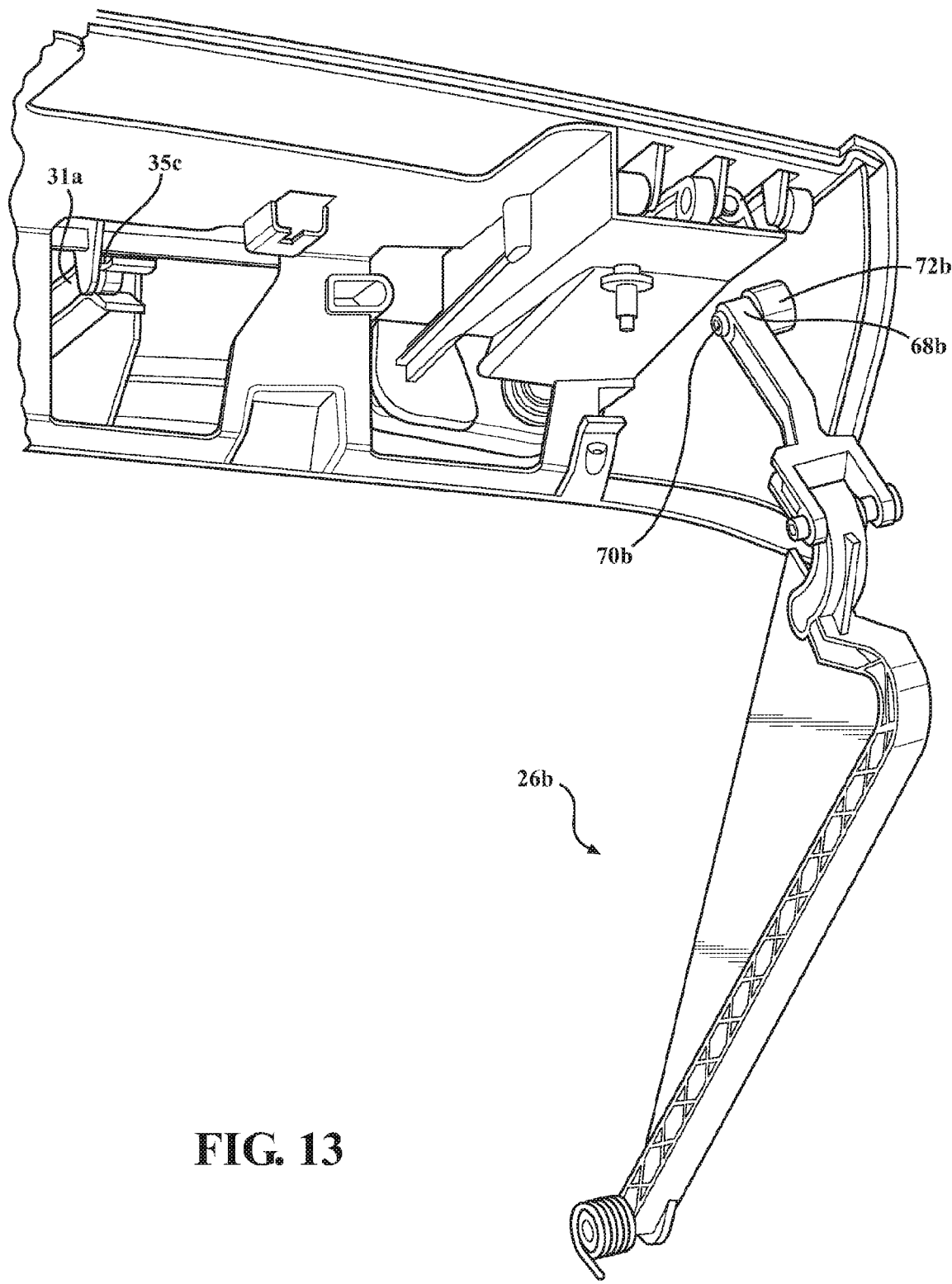
FIG. 13 is a bottom side sectional perspective view of the spoiler in the stowed position.
Figure 14:
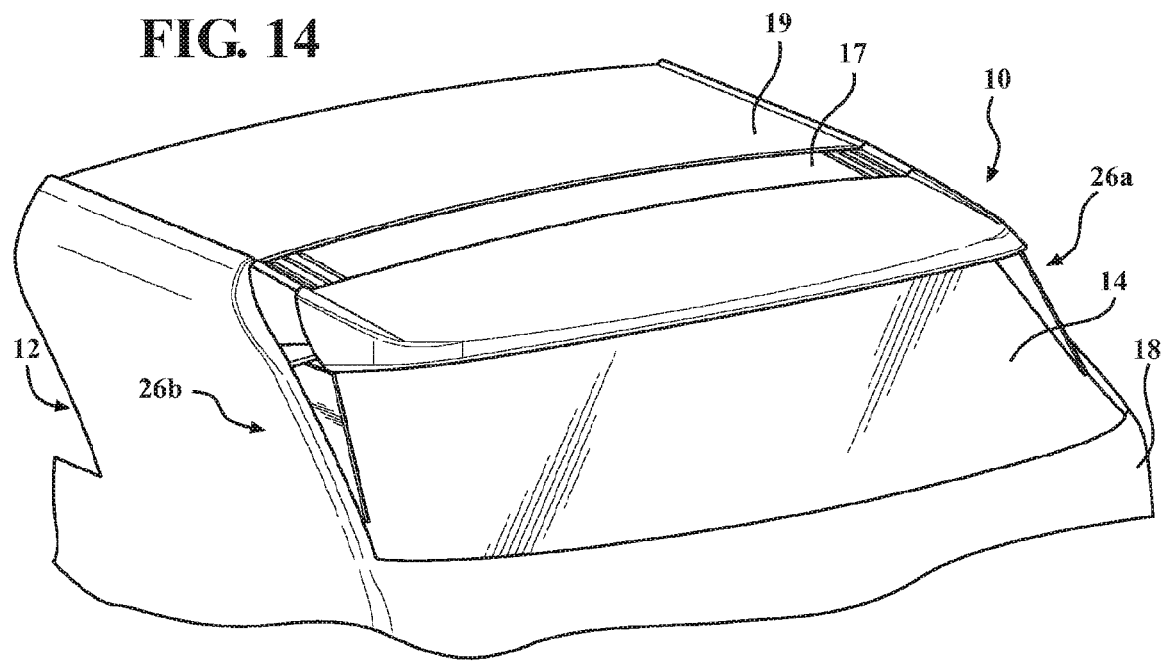
FIG. 14 is a rear perspective view of a vehicle lift gate having an active aerodynamic assembly shown in the deployed position.

Referring now all the figures, with particular reference to FIG. 10, the components of an active aero dynamic spoiler-pillar assembly 10 are shown and described. The active aerodynamic assembly 10 is connected to a lift gate 12 that includes a rear glass 14, which is optional since some lift gates are solid panels and do not have rear glass. The lift gate 12 includes an inner panel 16 and outer panel 18 that are connected together. The rear glass 14 is connected either to the outer panel 18 or a can be connected to the inner panel 16. The lift gate and the rear glass 14 have a forward side that faces the interior of the vehicle passenger compartment and a rearward side that faces the outside of the lift gate 12. When the inner panel 16 and the outer panel 14 are connected together a cavity 20a, 20b is formed on the left side and right side areas of what is typically referred to as the D pillar. The D pillar is also adjacent to vertically parallel sides of the rear glass 14. Between each of the vertically parallel sides of the rear glass and a portion of the outer panel 18 is an aperture 22a, 22b.

The active aerodynamic assembly 10 includes an active spoiler arrangement 24 and an active D pillar arrangement 26a, 26b located on the left and right hand side of the active aerodynamic assembly. While the active spoiler arrangement 24 and active D pillar arrangement 26a, 26b are shown in combination, it is within the scope of this invention for them to exist separately. For example it is possible for the active spoiler arrangement 24 to be used independent from the active D pillar arrangement 26a, 26b. It is also possible for the active D pillar arrangement 26a, 26b to exist separate from the active spoiler, with some actuator modifications.

The active spoiler arrangement 24 includes a frame 28 that is connected to the inner panel 16 and outer panel 18 of the lift gate 12. The frame 28 has two driven tracks referred to herein as driven track 30a, 30b and two guide tracks referred to as guide track 31a, 31b that extend parallel to each other along a deployment axis A-A of the frame 28. While a total of four tracks are shown on the frame 28 it is within the scope of this invention for a greater or lesser number of tracks to be used depending on the size of the frame and the particular application. Each of the driven track 30 tracks has slants 34a, 34b, 34c, 34d and each guide track 31a, 31b has slants 35a, 35b, 35c, 35d at each end, the purpose of which will be described later.

Figure 8:
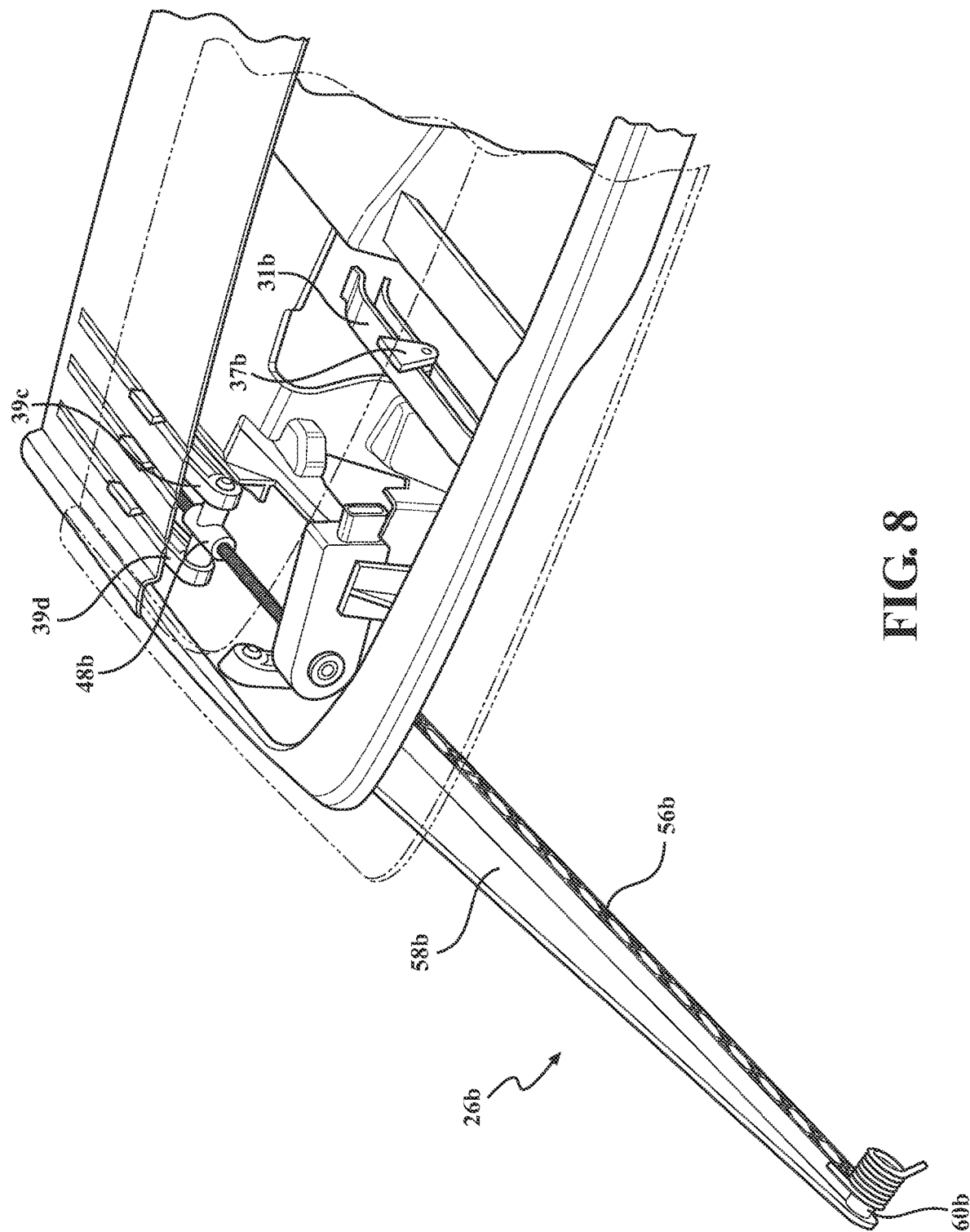
FIG. 8 is a top sectional perspective view of the spoiler, D pillar and actuation mechanism in the intermediate position.
Figure 9:
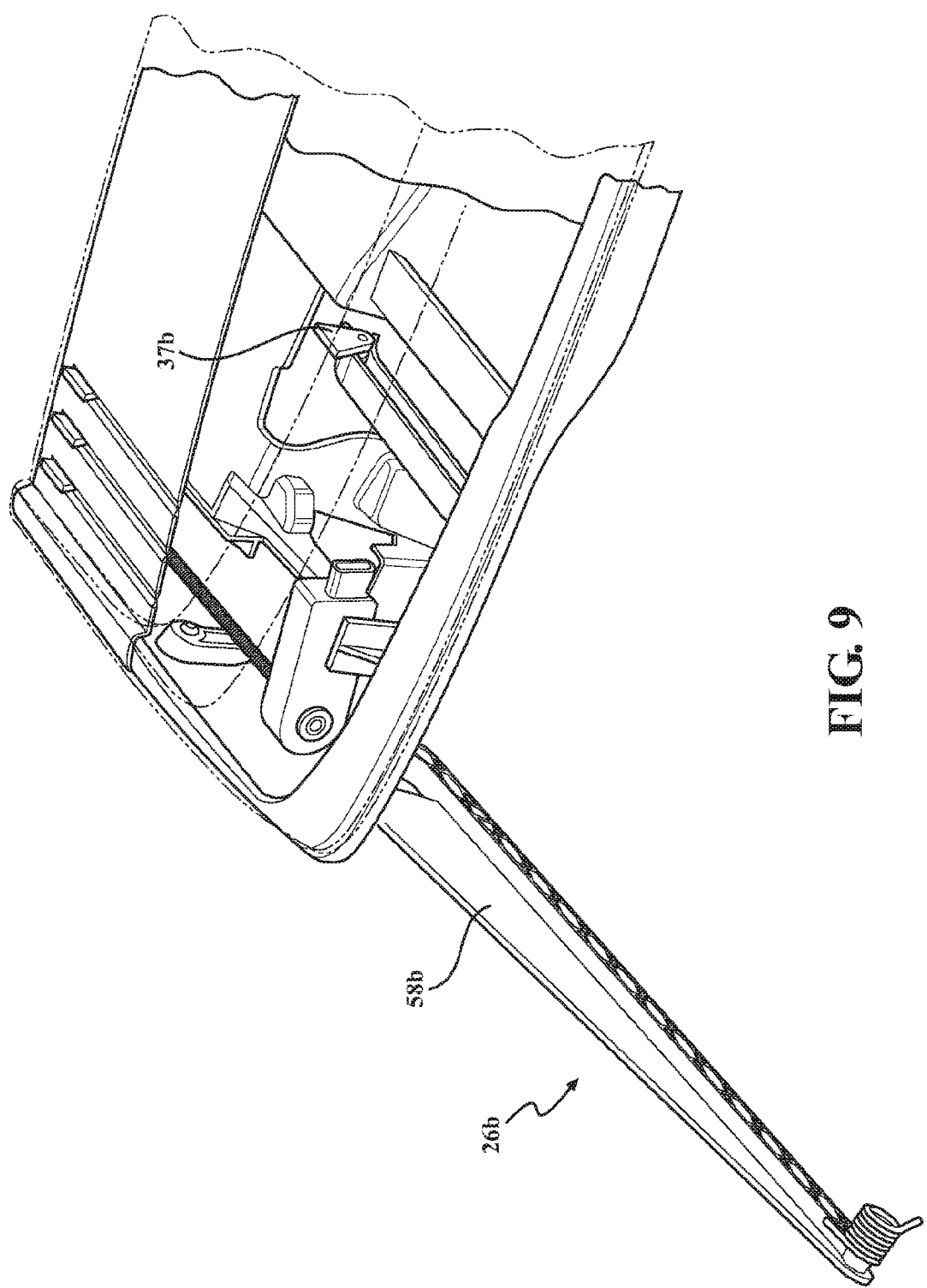
FIG. 9 is a top sectional perspective view of the spoiler, D pillar and actuation mechanism in the stowed position.

Connected to the frame 28 is a spoiler 36 that is a single piece or multiple pieces and is configurable to be slidable relative to the frame 28 along the deployment axis A-A. The spoiler 36 is connected to the frame 28 using two coupler links, referred to as coupler link 38a, 38b and at least one guide flange 37a, 37b. Shown best in FIGS. 5 and 8, the details of coupler link 38a, 38b and guide flange 37a, 37b are shown. While coupler link 38a, 38b is shown and described it is to be understood that coupler link 38a, 38b connects in the same manner.

The guide flange 37a, 37b is formed on and extends from the inside surface of the spoiler 36 and has a pin or bearing that connects to the guide track 31a, 31b of the frame 28. The guide flange 37a, 37b provides movement of the spoiler 36 along the deployment axis A-A by moving along the guide track 31a, 31b between a stowed position, intermediate position and deployed position. Likewise the driven track 30a, 30b drives the movement of the spoiler 36 between the stowed position, intermediate position and deployed position through the connection with a bearing 44a, 44b of the coupler link 38a, 38b described below. The slants 35a, 35b, 35c, 35d at each end of the guide track 31a, 31b and the slants 34a, 34b, 34c, 34d at each end of the driven track 30a, 30b allow the spoiler 36 to recess downward when in the stowed position and fully deployed position to make the top surface of the spoiler flush with the adjacent surfaces such as a roof 19 or a closeout panel 17 of the active aerodynamic assembly 10.

The degree and distance of the slants 34a, 34b, 34c, 34d, 35a, 35b, 35c, 35d can vary depending on the position of the adjacent surface that the spoiler 36 is to be flush with. The closeout panel 17 can be a single piece or multiple pieces where the spoiler 36 is positioned above the closeout panel 17 when in the stowed position but is flush or co-planar with the closeout panel 17 when in the deployed position. The closeout panel 17 covers and protects and covers the frame and other components of the active aerodynamic assembly 10 when the spoiler 36 is in the deployed position. The closeout panel 17 also has slots aligned with the driven track 30a, 30b and guide track 31a, 31b so that the spoiler 36 can connect through the closeout panel 19.

Figure 1:
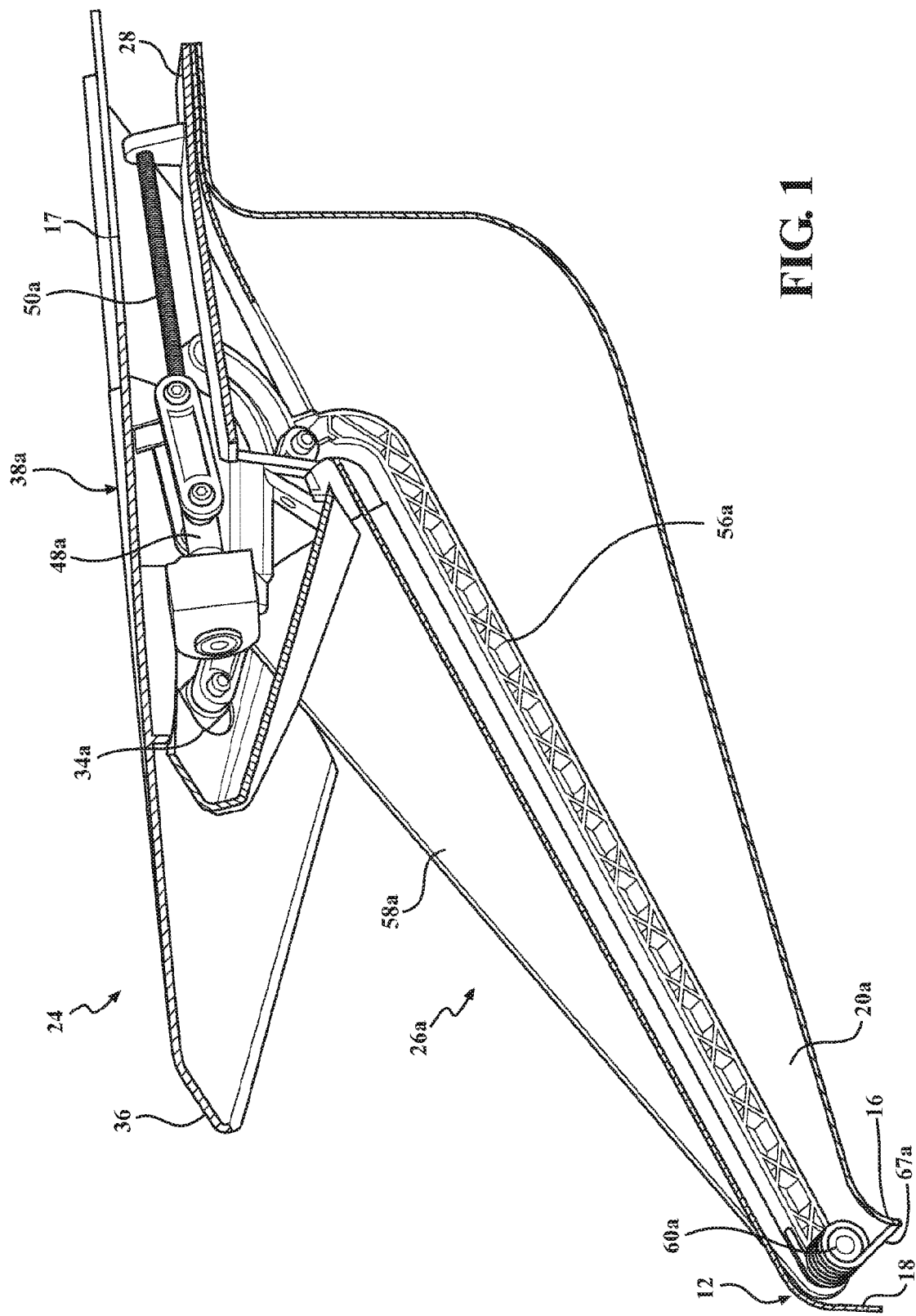
FIG. 1 is a right side sectional plan view of the spoiler and D pillar of the active aerodynamic assembly in the deployed position.
Figure 2:
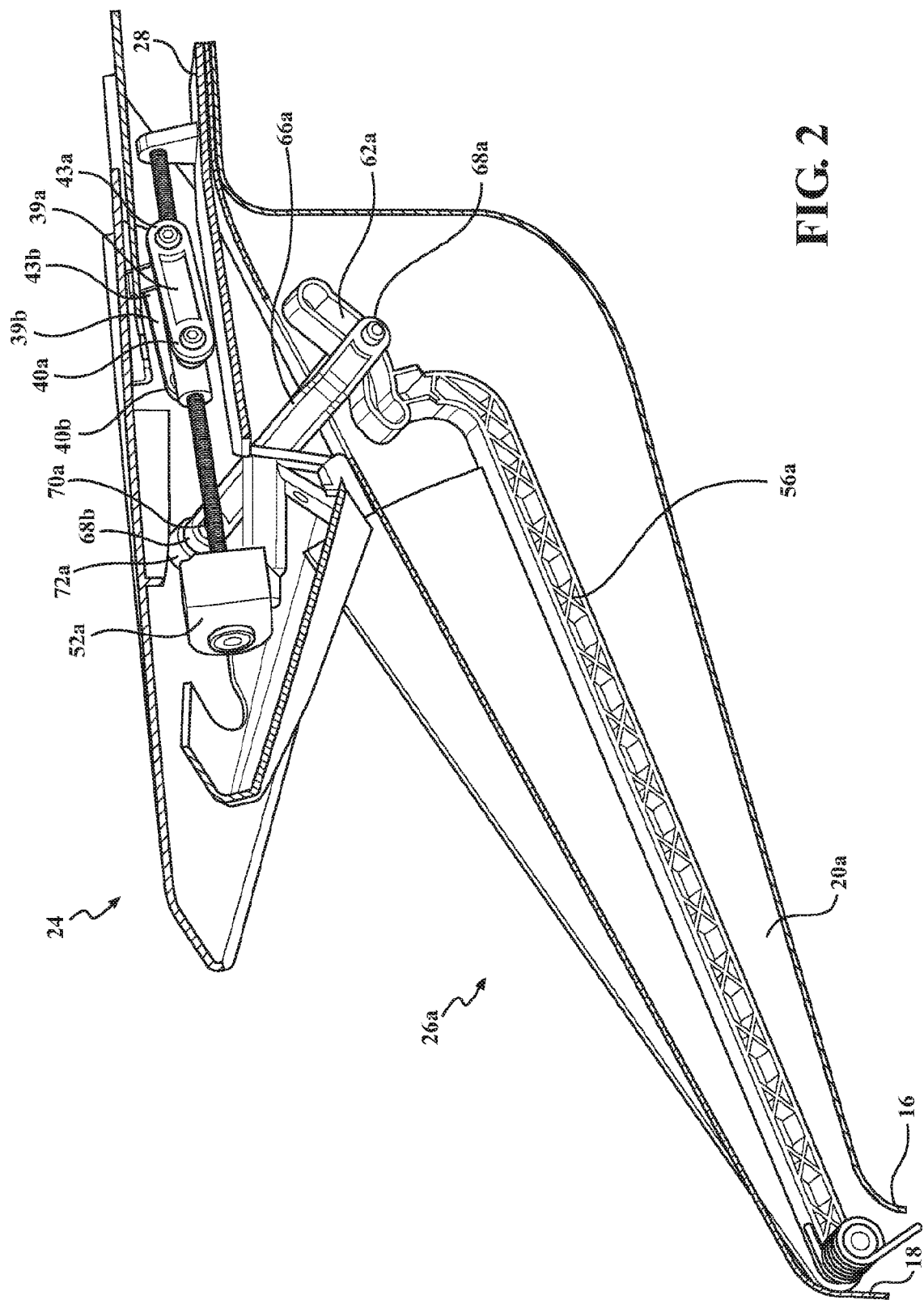
FIG. 2 is a right side sectional plan view of the spoiler and D pillar of the active aerodynamic assembly in the intermediate position.
Figure 3:
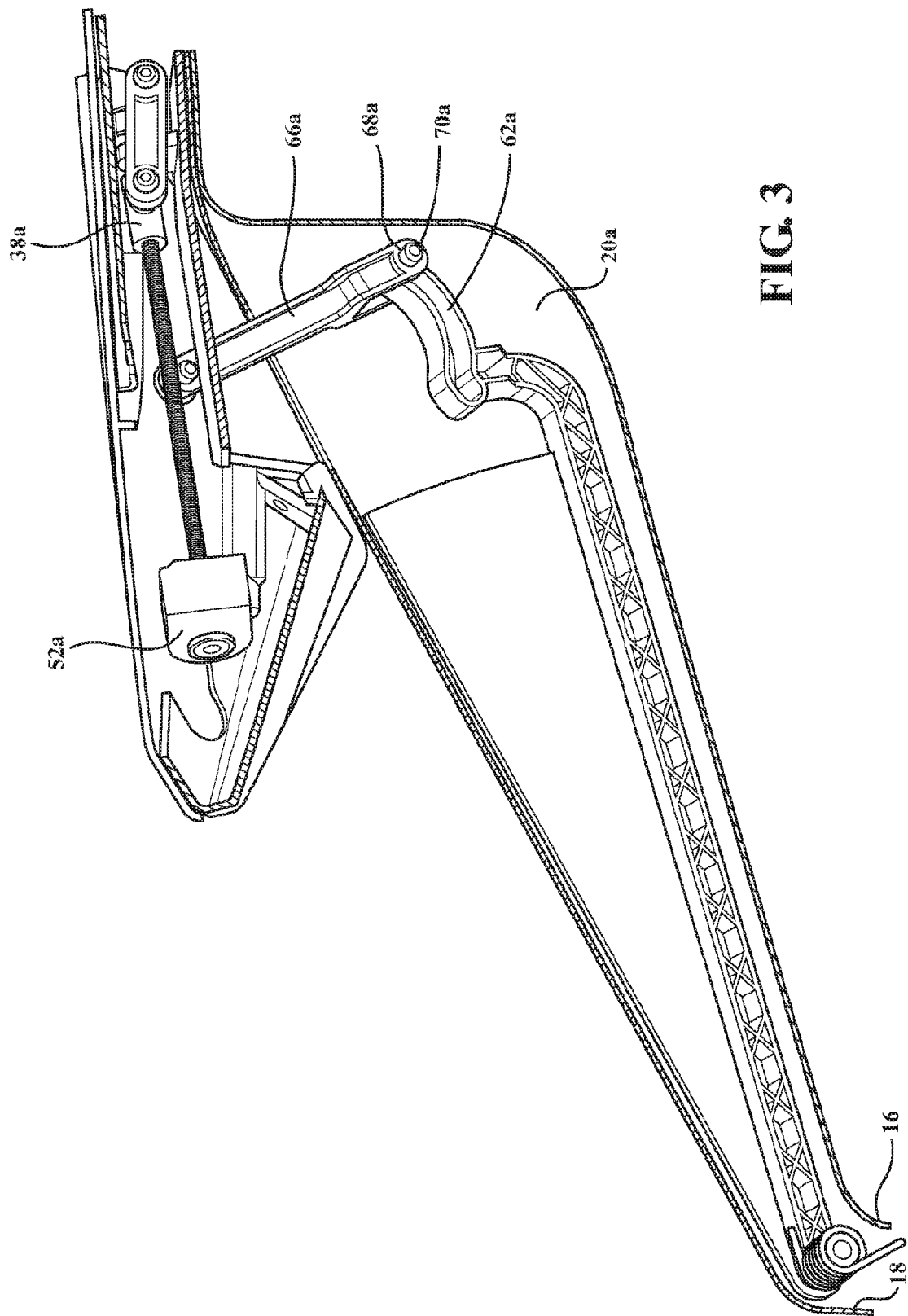
FIG. 3 is a right side sectional plan view of the spoiler and D pillar of the active aerodynamic assembly in the stowed position.
Figure 4:
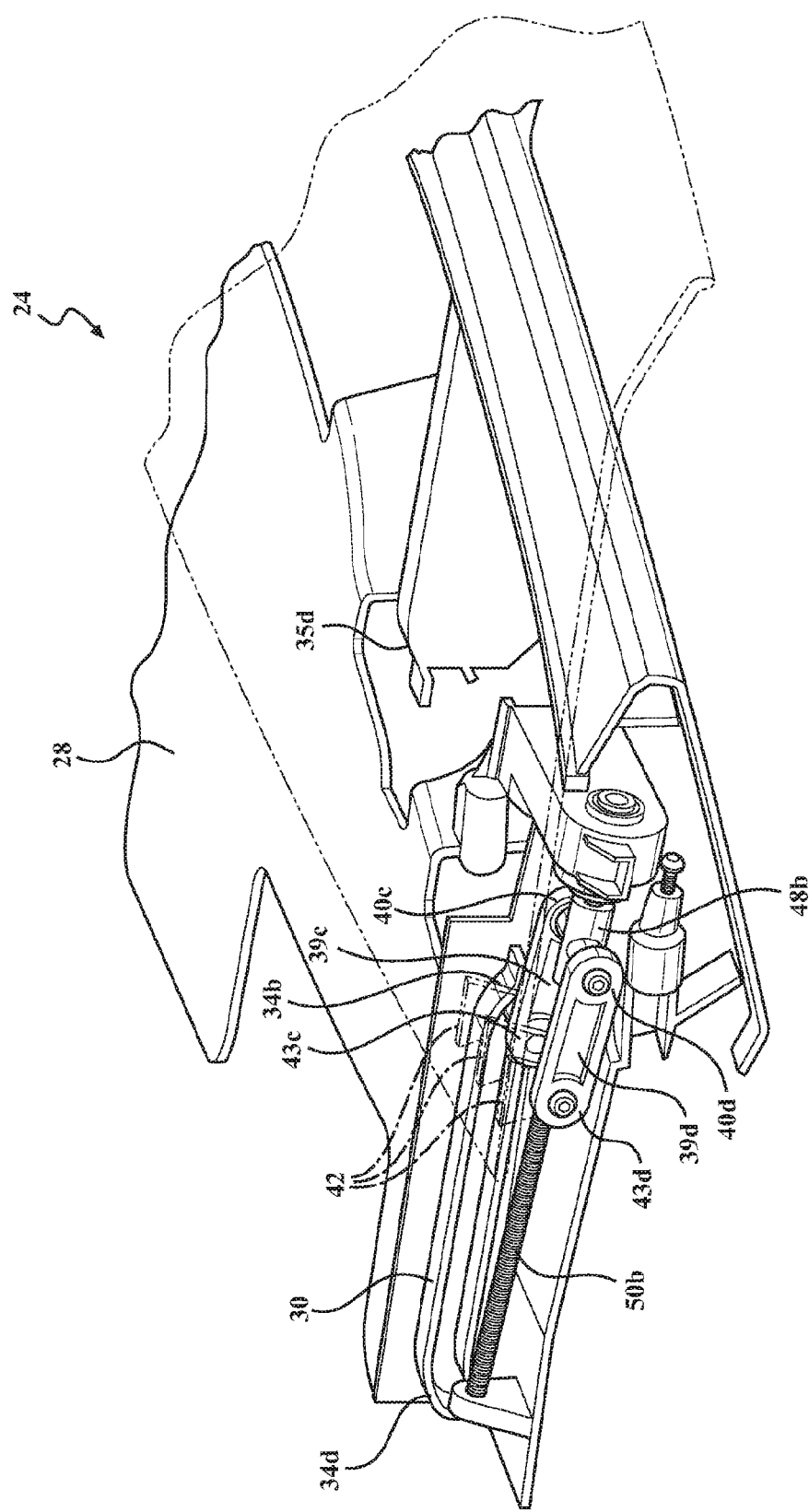
FIG. 4 is a side top sectional perspective view of the spoiler and actuation mechanism in the deployed position.
Figure 5:
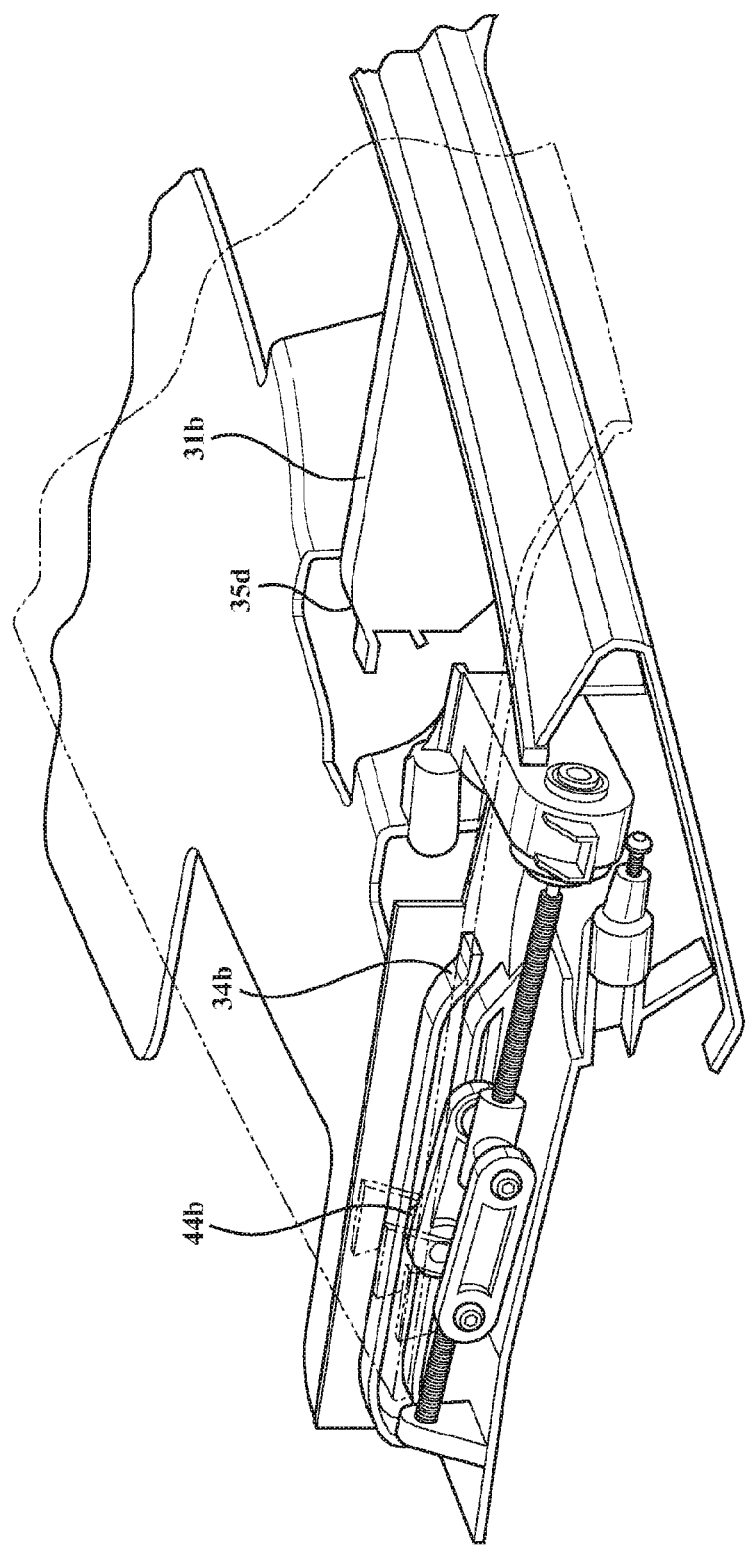
FIG. 5 is a side top sectional perspective view of the spoiler and actuation mechanism in the intermediate position.
Figure 6:
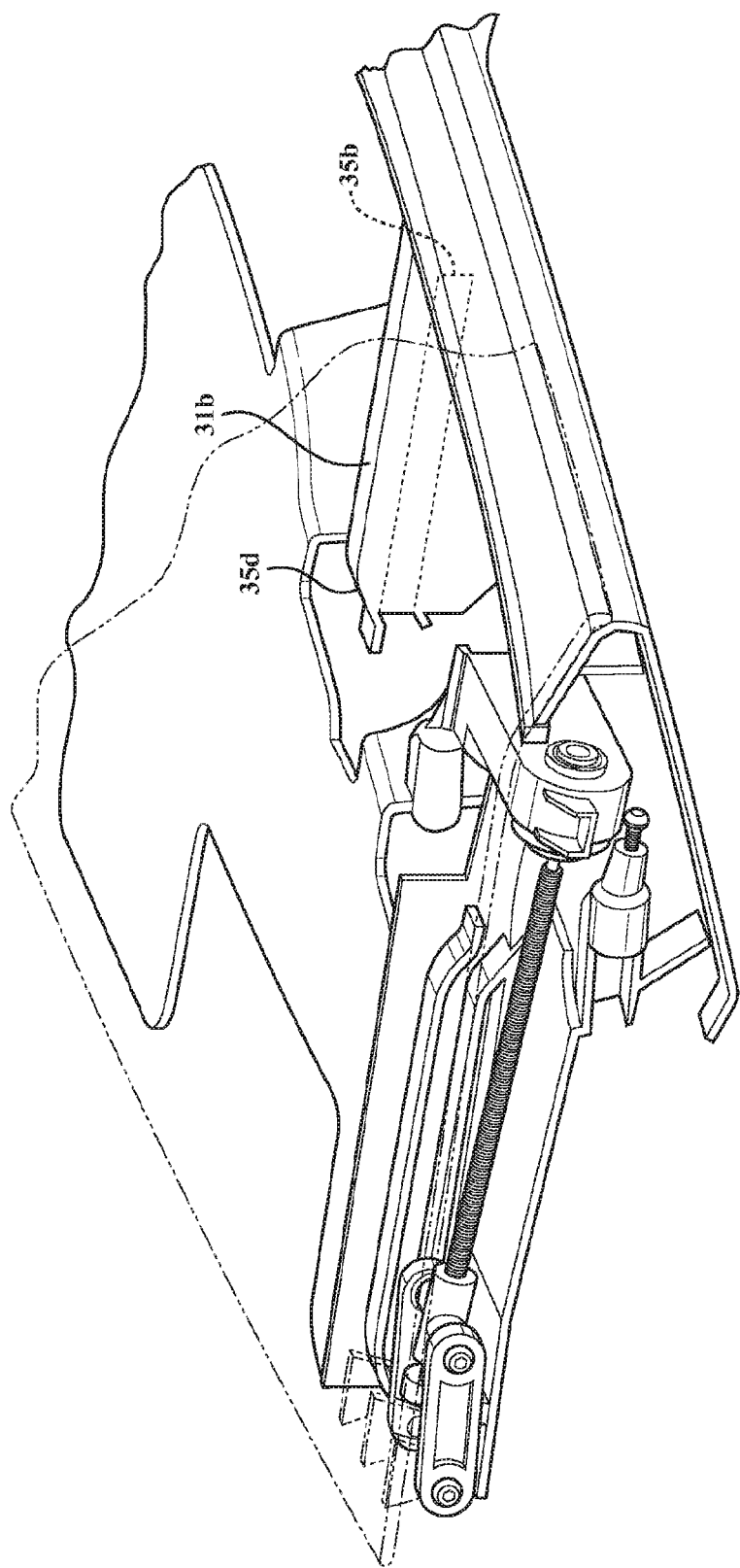
FIG. 6 is a side top sectional perspective view of the spoiler and actuation mechanism in the stowed position.
Figure 7:
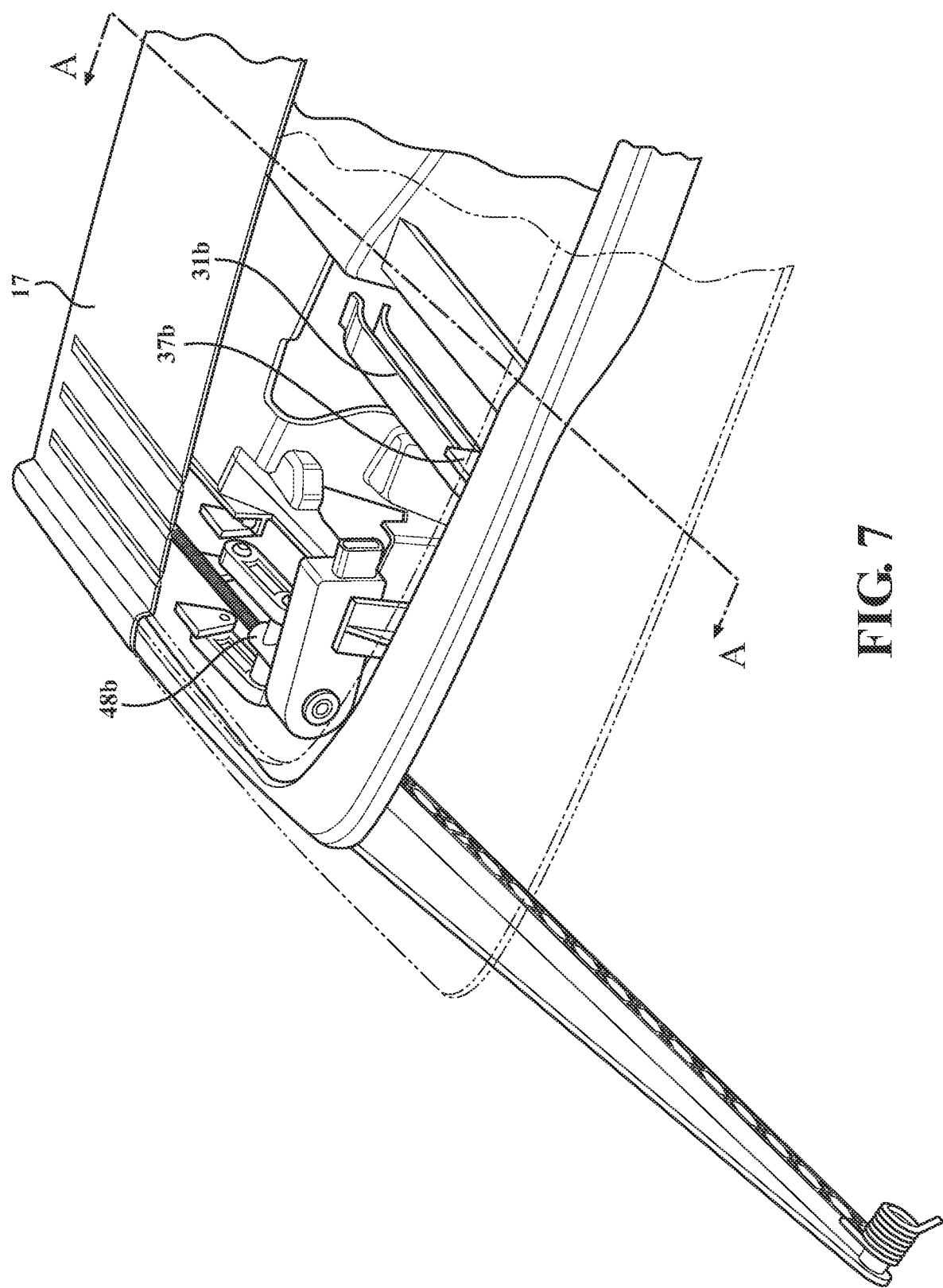
FIG. 7 is a top sectional perspective view of the spoiler, D pillar and actuation mechanism in the deployed position.

FIG. 5 also show the details of a coupler link 38a, 38b that connects the spoiler 36 to the frame 28. Each coupler link 38a, 38b has arms 39a, 39b, 39c, 39d each having a first end 43a, 43b, 43c, 43d pivotally connected to flanges 42 of the spoiler 36 and a second end 40a, 40b, 40c, 40d pivotally connect to a drive nut 48a, 48b that connects to a rotatable drive shaft 50a, 50b. First end 43b of arm 39b has a bearing 44b that connects to driven track 30a and the first end 43c of arm 39c has a bearing 44a that connects to driven track 30b. The second end 40a, 40b, 40c, 40d of the arms 39a, 39b, 39c, 39d of coupler link 38a, 38b both pivotally connect to the respective drive nut 48a, 48b that connects to a rotatable drive shaft 50a, 50b. The drive shaft 50a 50b is connected to and is rotated by an actuator 52a, 52b. When the actuator 52a, 52b rotates the drive shaft 50a, 50b in one direction the coupler link 38a, 38b will move in a first direction and the bearing 44a, 44b will moves along the driven track 30a, 30b. When the drive shaft 50a, 50b rotates in a second direction the drive nut 48a, 48b will move in the second direction and the coupler link 38a, 38b will move in a second direction opposite the first direction. The bearing 44a, 44b will slide along the driven track 30a, 30b. Thus the actuator 52a, 52b causes a push or pull force on the spoiler 36 thereby causing it to move between the stowed position, intermediate position or deployed position. While the drawings show primarily the details of one side of the active spoiler 24, the same structures are located on the other side of the active spoiler 24. However, depending on the application a greater or lesser number of actuators, coupler links, driven tracks and guide tracks are used, which can vary depending on many factors such as the size or weight of the spoiler and size of the actuator.

The active aerodynamic assembly 10 also includes the active D pillar arrangement 26a, 26b located on the left and right side of the lift gate 12 near the two vertical sides of the rear glass 14. It is within the scope of this invention for the active D pillar arrangement 26a, 26b to be driven by a separate actuator and usable on lift gates that do not have a moveable spoiler. However, in the present embodiment shown the active D pillar arrangement 26a, 26b is driven by the same actuator 52a, 52b as the spoiler 36 because the active D pillar arrangement 26a, 26b as described in greater detail below is connected to and is pulled or pushed by the spoiler 36.

Figure 15:
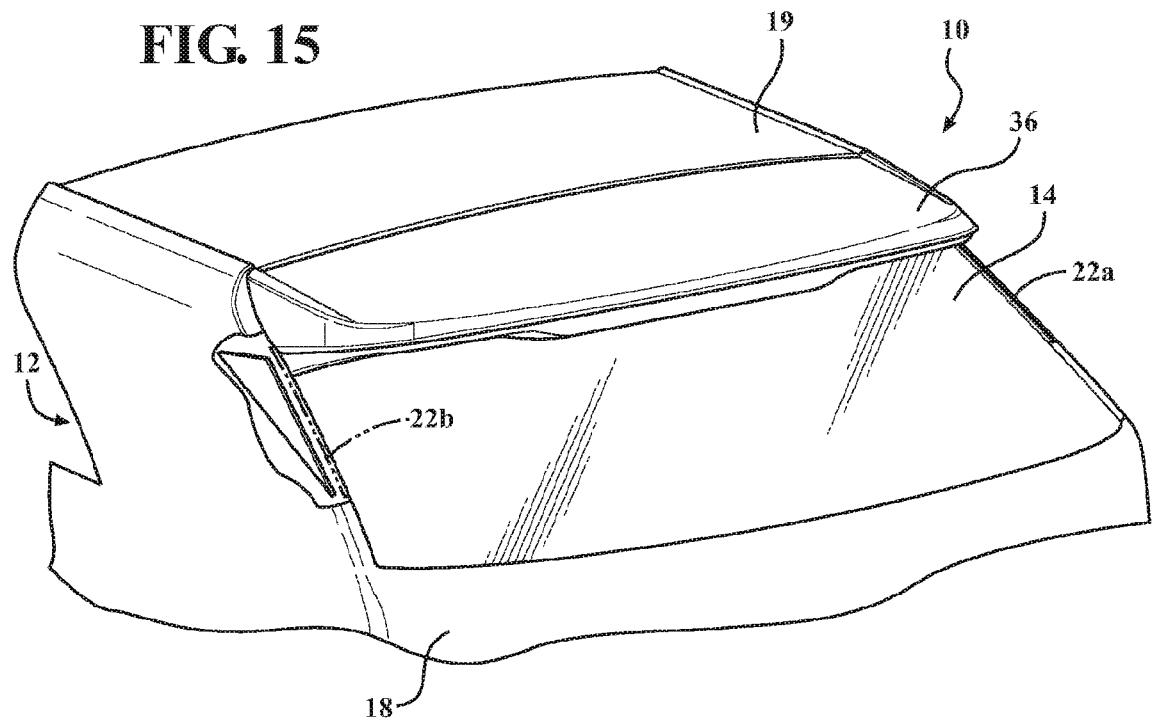
FIG. 15 is a partially broken away rear perspective view of a vehicle lift gate having an active aerodynamic assembly shown in the stowed position.
Figure 16:
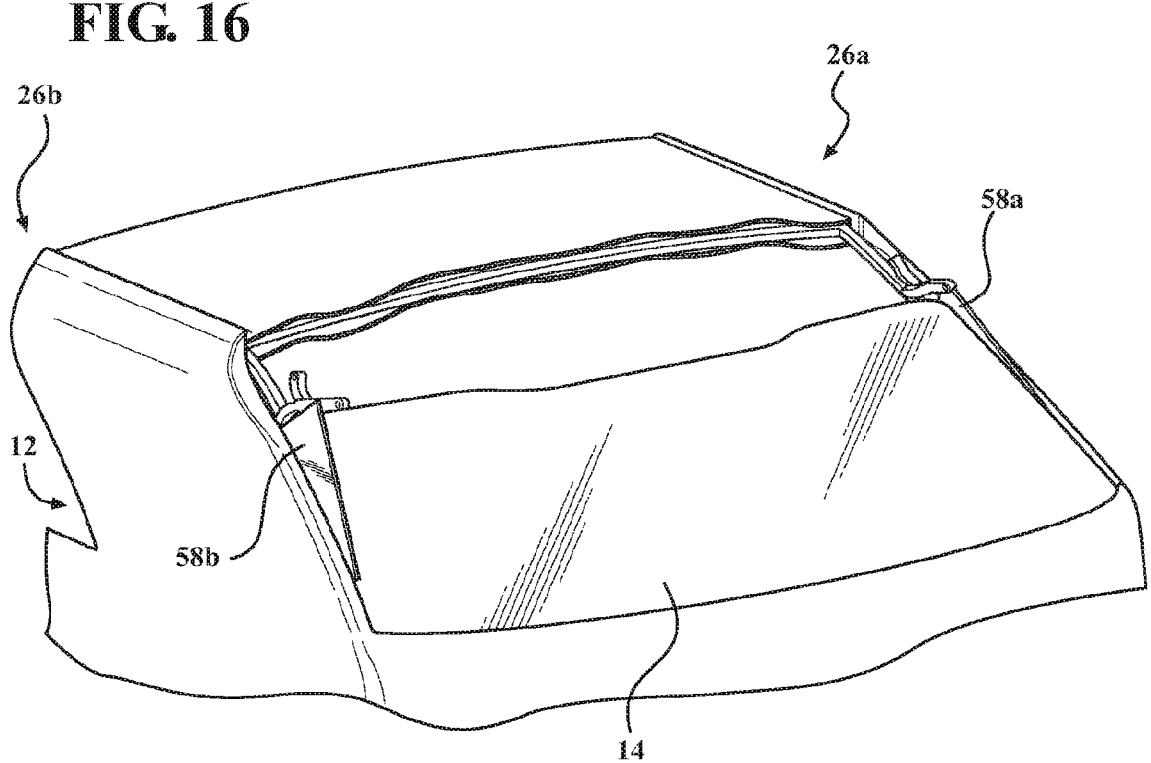
FIG. 16 is a partially broken away rear perspective view of a vehicle lift gate having an active aerodynamic pillar assembly shown in the deployed position.
Figure 17:
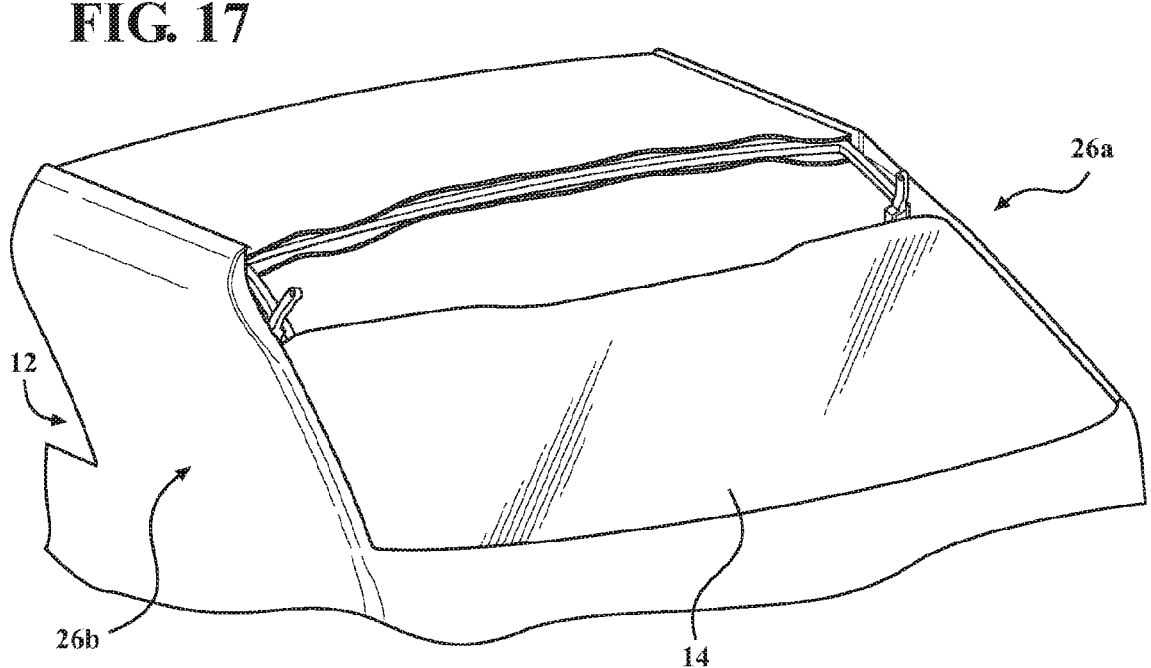
FIG. 17 is a partially broken away rear perspective view of a vehicle lift gate having an active aerodynamic pillar assembly shown in the stowed position.

Each active D pillar arrangement 26a, 26b includes a movable D pillar having a base portion 56a, 56b and a winglet body portion 58a, 58b. Each movable D pillar is pivotable about a pivot connection 60a, 60b to the inner panel 16 and is movable between a stowed position where the winglet body portion 58a, 58b is located forward of the rear glass 14 within the cavity 20a, 20b and a deployed position where the winglet body portion 58a, 58b extends through the aperture 22a, 22b (shown in FIG. 15) past the rearward side of the rear glass 14. It is also within the scope of the invention for the movable D pillar to be positioned at any intermediate position there between.

A portion of the base portion 56a, 56b of each movable D pillar 54a, 54b includes a base member slot 62a, 62b, which is a closed slot having a shaped cross-section that receives a first bearing end 64a, 64b of a slotted link 66a, 66b. The first bearing end 64a, 64b is a roller, but can also simply be a pin that moves within the base member slot 62a, 62b. When the slotted link 66a, 66b moves it will cause the movable D pillar 54a, 54b to rotate about the pivot connection 60a, 60b. The pivot connection 60a, 60b further includes a return spring 67a, 67b connected to the inner panel for providing a force that biases the D pillar arrangement 26a, 26b toward the stowed position.

At a second end 68a, 68b of the slotted link 66a, 66b there is a pivot connection 70a, 70b that connects to a bushing 72a, 72b formed on the inside surface of the spoiler 36. The pivot connection 70a, 70b as shown is a pin extending into the bushing 72a, 72b, however, it is within the scope of this invention for a bearing member to be used. During actuation of the spoiler 36, described above, the spoiler 36 will cause the slotted link 66a, 66b to move and rotate, the force of which is in turn transferred through the slotted link 66a, 66b to the base member slot 62a, 62b, which will then cause the slotted link 66a, 66b to pull upward or push downward on the base member slot 62a, 62b. This causes the first bearing end 64a, 64b of the slotted link 66a, 66b to slide along the base member slot 62a, 62b, which will cause the movable D pillar 54a, 54b to rotate about the pivot connection 60a, 60b with the inner panel 16 of the lift gate 12, thereby causing the movable D pillar 54a, 54b to rotate between the stowed position, intermediate position and deployed position. As described above the movable D pillar 54a, 54b is driven by the same actuator 52a, 52b as the spoiler. In the present embodiment of the invention it is contemplated that the movable spoiler has two actuators one for the left side and one for the right side in order to provide enough force to move the spoiler. Also the connection between the spoiler and the movable D pillar on the left side and right side are also driven by the same two actuators.

The description of the invention is merely exemplary in nature and, thus, variations that do not depart from the gist of the invention are intended to be within the scope of the invention. Such variations are not to be regarded as a departure from the spirit and scope of the invention.

What is claimed:

1. An active aerodynamic assembly comprising:
a lift gate formed by connecting together an inner panel and an outer panel;
at least one cavity formed between the inner panel and the outer panel;
an aperture to the at least one cavity formed through a portion of the outer panel;
at least one D pillar arrangement including a moveable D pillar positionable within the at least one cavity and aligned with the aperture, wherein the at least one moveable D pillar is moveable between a stowed position, where the at least one moveable D pillar is located within the at least one cavity and a deployed position, where a portion of the D pillar extends through the aperture past the outer panel of the lift gate; and
an actuator positioned in the at least one cavity, wherein the actuator is connected the at least one D pillar arrangement and moves the D pillar arrangement between the stowed position and the deployed position.

2. The active aerodynamic assembly of claim 1, wherein the active spoiler arrangement further includes:
a frame connected to the inner panel of the lift gate, wherein the frame has at least one drive track formed on the frame such that the at least one drive track extends along the deployment axis; and
at least one coupler link connectable with the D pillar arrangement, wherein the at least one coupler link is driven by the actuator along the at least one drive track of the frame.

3. The active aerodynamic assembly of claim 2, further comprising:

a drive shaft having a threaded surface connected to the actuator, wherein the drive shaft is bi-directionally rotatable by the actuator;
the at least one coupler link includes a drive nut connected to the threaded surface of the drive shaft and moveable along the drive shaft in response to rotation of the drive shaft by the actuator.

4. The active aerodynamic assembly of claim 2 further comprising:
a base portion of the at least one D pillar arrangement and a winglet portion connected to the base portion, wherein the winglet portion extends through the aperture past outer panel of the lift gate when the at least one D pillar arrangement is moved to the deployed position;
a slotted link pivotally connectable to the actuator at one end and the base portion at a second end, wherein the slotted link transfers force from the actuator to the at least one D pillar arrangement to cause the at least one D pillar arrangement to move between the stowed position and the deployed position.

5. The active aerodynamic assembly of claim 4, wherein the base portion further includes a base member slot that receives a portion of the second end of the slotted link, thereby allowing the at least one D pillar arrangement to rotate about the second end of the slotted link.

6. The active aerodynamic assembly of claim 5, wherein the base portion of the at least one D pillar arrangement includes a pivot connection and return spring connected to the inner panel for providing a force that biases the at least one D pillar arrangement toward the stowed position.

7. An active aerodynamic assembly comprising:
a lift gate formed by connecting together an inner panel and an outer panel;
at least one cavity formed between the inner panel and the outer panel;
an aperture to the at least one cavity formed through a portion of the outer panel;
an active spoiler arrangement connected to the at least one cavity and having a spoiler capable of moving between a stowed position and a deployed position along a deployment axis;
at least one D pillar arrangement including a moveable D pillar positionable within the at least one cavity and aligned with the aperture, wherein the at least one moveable D pillar is moveable between a stowed position, where the at least one moveable D pillar is located within the at least one cavity and a deployed position, where a portion of the D pillar extends through the aperture past the outer panel of the lift gate; and
an actuator positioned in the at least one cavity, wherein the actuator is connected to the active spoiler arrangement to selectively move the active spoiler arrangement between a stowed position and a deployed position, wherein the at least one D pillar arrangement is connected to the active spoiler arrangement and the at least one D pillar arrangement moves between the stowed position and the deployed position in response to movement of the active spoiler arrangement.

8. The active aerodynamic assembly of claim 7, wherein the active spoiler arrangement further includes:
a frame connected to the inner panel of the lift gate, wherein the frame has at least one drive track formed on the frame such that the at least one drive track extends along the deployment axis; and at least one coupler link connected between the spoiler and at least one guide track, wherein the at least one coupler link is driven by the actuator along the at least one drive track of the frame.

9. The active aerodynamic assembly of claim 8, wherein the active spoiler arrangement further includes:
at least one guide track formed on the frame such that the at least one drive track and at least one guide track are parallel to each other and extend along the deployment axis;
at least one guide flange connected between the spoiler and the at least one guide track, wherein the at least one guide flange moves along the at least one guide flange in response to the at least guide flange being driven by the actuator; and
at least one coupler link connected between the spoiler and at least one drive track, wherein the at least one coupler link moves in the at least one guide track in response to the at least one coupler link being driven by the actuator.

10. The active aerodynamic assembly of claim 9, further comprising slants at each end of the at least one guide track and slants at each end of the at least one driven track that allows the spoiler to recess downward when in the stowed position and deployed position to make a top surface of the spoiler flush with adjacent surfaces.

11. The active aerodynamic assembly of claim 8, further comprising slants at each end of the guide track that allows the spoiler to recess downward when in the stowed position and deployed position to make a top surface of the spoiler flush with adjacent surfaces.

12. The active aerodynamic assembly of claim 11, wherein the adjacent surfaces include a roof of a vehicle and a closeout panel of the active spoiler arrangement.

13. The active aerodynamic assembly of claim 8, further comprising:
a drive shaft having a threaded surface connected to the actuator, wherein the drive shaft is bi-directionally rotatable by the actuator;
the at least one coupler link includes a drive nut connected to the threaded surface of the drive shaft and moveable along the drive shaft in response to rotation of the drive shaft by the actuator.

14. The active aerodynamic assembly of claim 7 further comprising:
a base portion of the at least one D pillar arrangement and a winglet portion connected to the base portion, wherein the winglet portion extends through the aperture past outer panel of the lift gate when the at least one D pillar arrangement is moved to the deployed position;
a slotted link pivotally connected to the spoiler at one end and the base portion at a second end, wherein the slotted link transfers force from the spoiler to the at least one D pillar arrangement to cause the at least one D pillar arrangement to move between the stowed position and the deployed position.

15. The active aerodynamic assembly of claim 14, wherein the base portion further includes a base member slot that receives a portion of the second end of the slotted link, thereby allowing the at least one D pillar arrangement to rotate about the second end of the slotted link.

16. The active aerodynamic assembly of claim 15, wherein the base portion of the at least one D pillar arrangement includes a pivot connection and return spring connected to the inner panel for providing a force that biases the at least one D pillar arrangement toward the stowed position.

* * * * *